(12) United States Patent
O'Neill et al.

(10) Patent No.: US 8,812,603 B2
(45) Date of Patent: Aug. 19, 2014

(54) METHOD, SYSTEM AND APPARATUS FOR PROCESSING CALENDAR EVENTS

(75) Inventors: Conor Michael O'Neill, Waterloo (CA); Daryl Joseph Martin, Kitchener (CA); Marcin Cietwierkowski, Kitchener (CA)

(73) Assignee: BlackBerry Limited, Waterloo (CA)

( * ) Notice: Subject to any disclaimer, the term of this patent is extended or adjusted under 35 U.S.C. 154(b) by 56 days.

(21) Appl. No.: 13/469,397

(22) Filed: May 11, 2012

(65) Prior Publication Data
US 2013/0304825 A1    Nov. 14, 2013

(51) Int. Cl.
G06F 15/16    (2006.01)

(52) U.S. Cl.
USPC .......................................... 709/206; 709/204

(58) Field of Classification Search
USPC .......... 709/201–206, 217–219; 707/609, 610, 707/621, 694
See application file for complete search history.

(56) References Cited

U.S. PATENT DOCUMENTS

| | | | |
|---|---|---|---|
| 5,493,692 A * | 2/1996 | Theimer et al. ............. | 455/26.1 |
| 6,457,132 B1 * | 9/2002 | Borgendale et al. .......... | 713/320 |
| 6,831,970 B1 | 12/2004 | Awada et al. | |
| 7,657,290 B2 | 2/2010 | Veselic et al. | |
| 7,706,837 B2 * | 4/2010 | Ladouceur ................. | 455/556.1 |
| 7,747,948 B2 * | 6/2010 | Jung ............................ | 715/255 |
| 7,853,813 B2 | 12/2010 | Lee | |
| 7,861,098 B2 | 12/2010 | Theocharous et al. | |
| 7,917,127 B2 | 3/2011 | Mousseau | |
| 7,925,241 B2 * | 4/2011 | Helvick ..................... | 455/412.2 |
| 7,929,960 B2 * | 4/2011 | Martin et al. ................. | 455/419 |
| 7,933,611 B2 * | 4/2011 | Bocking et al. ............ | 455/456.4 |
| 8,018,795 B2 * | 9/2011 | Adams ............................ | 368/10 |
| 8,095,814 B2 * | 1/2012 | O'Connell et al. ........... | 713/323 |
| 8,234,244 B2 * | 7/2012 | Eldering et al. ............. | 707/621 |
| 8,478,721 B2 * | 7/2013 | Ramanujam .................. | 707/621 |
| 2007/0060107 A1 | 3/2007 | Day | |
| 2007/0239619 A1 | 10/2007 | Maruyama et al. | |
| 2009/0052652 A1 | 2/2009 | Silver | |
| 2010/0190474 A1 * | 7/2010 | Rajguru ..................... | 455/412.1 |
| 2010/0223088 A1 * | 9/2010 | Martin et al. ..................... | 705/9 |

(Continued)

FOREIGN PATENT DOCUMENTS

EP    1703407 A1    9/2006

OTHER PUBLICATIONS

"Nokia Situations", [retrieved on Mar. 25, 2012]. Retrieved from the Internet: <http://betalabs.nokia.com/apps/nokia-situations>.

(Continued)

*Primary Examiner* — Hassan Kizou
*Assistant Examiner* — Phyllis Book
(74) *Attorney, Agent, or Firm* — Perry + Currier Inc.; Kristjan Spence

(57) ABSTRACT

According to embodiments described in the specification, a method, system and apparatus for processing calendar events are provided. The method comprises: receiving a calendar event invitation message addressed to at least one recipient device and storing the calendar event invitation message in a memory; determining, at a processor, whether to disable at least one recipient device function; when the determination is affirmative, generating a recipient policy including a recipient device function identifier, and a rule associated with the function identifier; and deploying the recipient policy for the at least one recipient device such that the function is disabled at the recipient device for at least a period of time.

14 Claims, 7 Drawing Sheets

(56) References Cited

U.S. PATENT DOCUMENTS

2010/0223089 A1* 9/2010 Godfrey et al. ............... 705/9
2010/0304719 A1* 12/2010 Deep ............................ 455/413
2010/0306170 A1* 12/2010 Freedman et al. ........... 707/621
2011/0071884 A1 3/2011 Michaelis et al.
2012/0278431 A1* 11/2012 Luna ............................ 709/217

OTHER PUBLICATIONS

Corresponding European Patent Application No. 12167738.9 Search Report dated Feb. 22, 2013.

* cited by examiner

METHOD, SYSTEM AND APPARATUS FOR PROCESSING CALENDAR EVENTS

FIELD

The specification relates generally to calendar events, and specifically to a method, system and apparatus for processing calendar events.

BACKGROUND

Communication devices, such as smart phones, tablet computers and the like, can receive a variety of communications, including telephone calls, emails and the like. Each of these communications can result in the generation of notification signals (flashing lights, ring tones, and the like) at the communication device. In certain situations, such notifications can be not only disruptive, but also unnecessary and therefore wasteful of the devices' limited computational and power resources.

BRIEF DESCRIPTIONS OF THE DRAWINGS

Non-limiting example embodiments are described with reference to the following figures, in which.

DETAILED DESCRIPTION

According to an aspect of the specification, a method is provided, comprising: receiving a calendar event invitation message addressed to at least one recipient device and storing the calendar event invitation message in a memory; determining, at a processor, whether to disable at least one recipient device function; when the determination is affirmative, generating a recipient policy including a recipient device function identifier, and a rule associated with the function identifier; and deploying the recipient policy for the at least one recipient device such that the function is disabled at the recipient device for at least a period of time.

According to another aspect of the specification, a non-transitory computer readable medium is provided, storing a plurality of computer readable instructions executable by a processor for implementing the above method.

According to a further aspect of the specification, a server is provided, comprising: a memory; a communications interface; and a processor interconnected with the memory and the communications interface, the processor configured to receive a calendar event invitation message, via the communications interface, addressed to at least one recipient device and to store the calendar event invitation message in the memory; the processor further configured to determine whether to disable at least one recipient device function; the processor further configured, when the determination is affirmative, to generate a recipient policy including a recipient device function identifier, and a rule associated with the function identifier; and the processor further configured to deploy the recipient policy for the at least one recipient device such that the function is disabled at the recipient device for at least a period of time.

Figure 1:
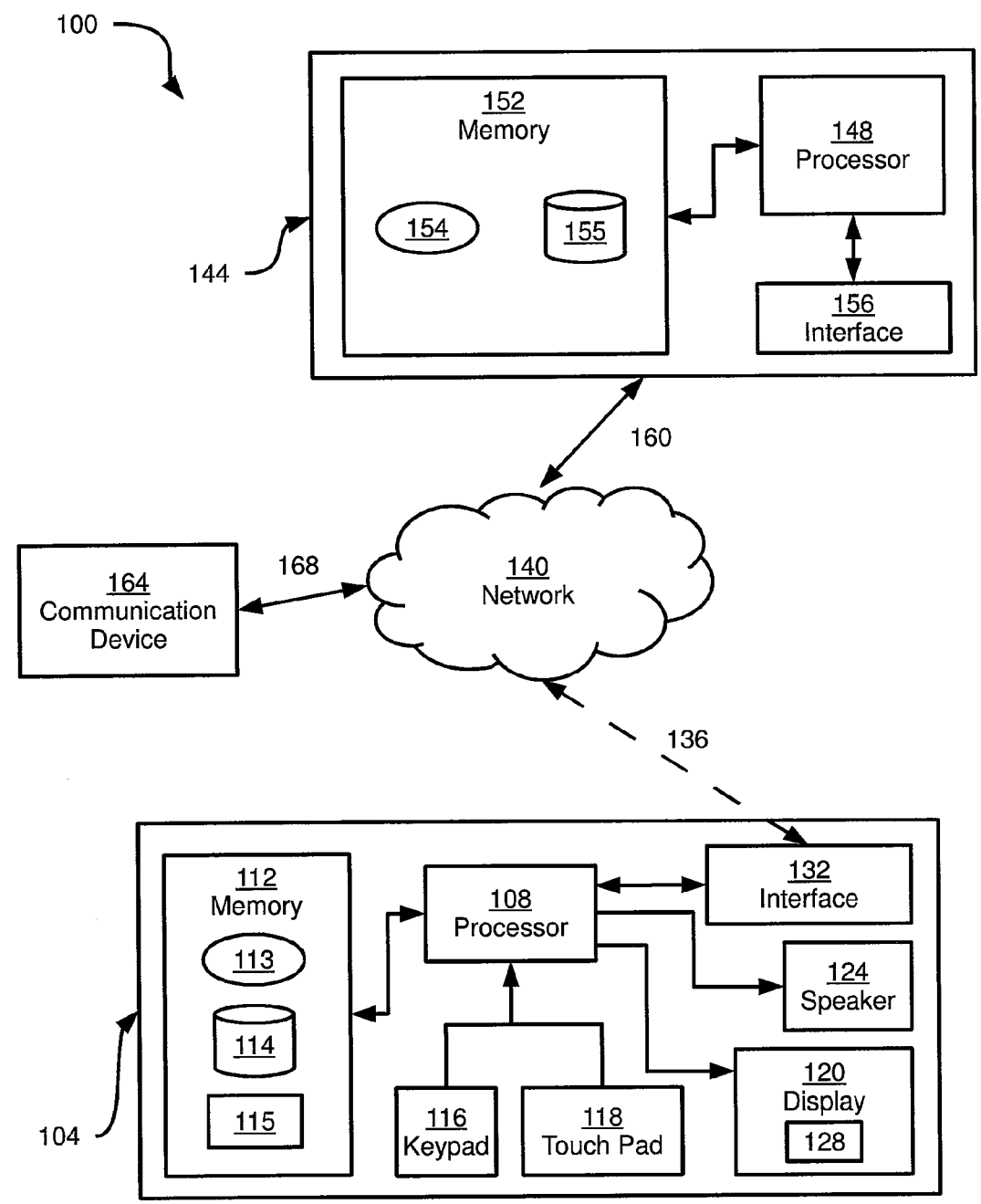
FIG. 1 depicts a system for processing calendar events, according to a non-limiting embodiment.

FIG. 1 depicts a communications system 100. System 100 includes an electronic communication device 104, also referred to herein as communication device 104. In the present example, communication device 104 is based on the computing environment and functionality of a hand-held wireless communication device, such as a cellular telephone, smart telephone, Personal Digital Assistant ("PDAs"), media (e.g. MP3) player, tablet computer, and the like. Communication device 104 is not limited to a hand-held wireless communication device, however. Other communication devices are also contemplated, such as laptop computers and the like.

Communication device 104 includes a processor 108 interconnected with a non-transitory computer readable storage medium such as a memory 112. Memory 112 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112 includes both a volatile memory and a non-volatile memory.

Memory 112 stores a plurality of computer readable instructions executable by processor 108. Such instructions can include, for example, an operating system and a variety of applications. In particular, memory 112 stores a calendar application 113. When processor 108 executes the instructions of application 113, processor 108 is configured to perform various functions, as will be discussed below in greater detail. Memory 112 also stores a calendar database 114, which contains data representing various calendar events accessible to processor 108 during the execution of application 113. It is contemplated that memory 112 can store a variety of additional applications, such as a messaging application, a telephony application, and the like. Memory 112 also maintains a policy store 115, which will be discussed in greater detail below.

Communication device 104 also includes one or more input devices interconnected with processor 108. Such input devices are configured to receive input and provide data representative of such input to processor 108. Input devices can include, for example, a keypad 116 and a touch pad 118. Thus, keypad 116 can receive input in the form of the depression of one or more keys, and can then provide data representative of such input to processor 108. The data provided to processor 108 can be, for example, an American Standard Code for Information Interchange (ASCII) value for each of the depressed keys. Keypad 116 can be a full QWERTY keypad, a reduced QWERTY keypad or any other suitable arrangement of keys. Touch pad 118 can receive input in the form of depression of touch pad 118 or swipe gestures along the surface of touch pad 118, and can then provide data representative of such input to processor 108 in the form of, for example, coordinates representing the location of a virtual cursor.

In some example embodiments, communication device 104 can include additional input devices in the form of one or more touch screens, buttons, light sensors, microphones, cameras and the like (not shown). More generally, any suitable combination of the above-mentioned input devices can be incorporated into communication device 104.

Communication device 104 further includes one or more output devices interconnected with processor 108. The output devices of communication device 104 include a display 120 and a speaker 124. Display 120 includes display circuitry 128 controllable by processor 108 for generating interfaces which include representations of data and/or applications maintained in memory 112. Display 120 includes a flat panel display comprising any one of, or any suitable combination of, a Liquid Crystal Display (LCD), a plasma display, an Organic Light Emitting Diode (OLED) display, and the like. Circuitry 128 can thus include any suitable combination of display buffers, transistors, LCD cells, plasma cells, phosphors, LEDs and the like. When the input devices of mobile electronic device 104 include a touch screen input device, the touch screen (not shown) can be integrated with display 120.

Additional output devices are also contemplated, including, for example, a light-emitting indicator (not shown) in the form of an LED, and a motor or other mechanical output device (not shown) for causing communication device 104 to vibrate. In general, communication device 104 can include any suitable combination of the above-mentioned output devices, and may also include other output devices.

Communication device 104 also includes a communications interface 132 interconnected with processor 108. Communications interface 132 allows communication device 104 to communicate with other devices via a link 136 and a network 140. Network 140 can include any suitable combination of wired and/or wireless networks, including but not limited to a Wide Area Network (WAN) such as the Internet, a Local Area Network (LAN), cell phone networks, WiFi networks, WiMax networks and the like. Link 136 is compatible with network 140. In particular, link 136 can be a wireless link based on any of the Global System for Mobile communications (GSM), General Packet Radio Service (GPRS), Enhanced Data rates for GSM Evolution (EDGE), third and fourth-generation mobile communication system (3G and 4G), Institute of Electrical and Electronic Engineers (IEEE) 802.11 (WiFi) or other wireless protocols or standards. Link 136 can also include any base stations and backhaul links necessary to connect mobile electronic device 104 to network 140.

Communications interface 132 is selected for compatibility with link 136 as well as with network 140. Communications interface 132 thus includes one or more transmitter/receiver assemblies, or radios, and associated circuitry. For example, communications interface 132 can include a first radio for enabling communications over a WiFi network, and a second radio for enabling communications over one or more mobile telephone networks (e.g. 3G networks).

The various components of communication device 104 are contained within a housing (not shown) comprising any suitable combination of materials (e.g. aluminum, plastics, and the like). The components of mobile electronic device 104 are interconnected via a communication bus (not shown). Communication device 104 can be powered by a battery (not shown) also contained within the housing, though it will be understood that communication device 104 can also be supplied with electricity by a wired connection to a wall outlet or other power source, for example when docked.

In some example embodiments, certain components need not be contained within the same housing. For example, an input device such as a keyboard can be contained in a housing separate from that of communication device 104 and interconnected with processor 108 via, for example, a Universal Serial Bus (USB) or Bluetooth™ connection.

System 100 also includes a server 144, which can be based on any known server environment. In the present example, server 144 includes one or more processors, such as a processor 148. Processor 148 is interconnected with a non-transitory computer-readable storage medium, such as a memory 152. Memory 152 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Memory 152 stores a plurality of computer readable instructions executable by processor 148. Such instructions can include, for example, an operating system and a variety of applications. In particular, memory 152 stores a policy application 154. When processor 148 executes the instructions of application 154, processor 148 is configured to perform various functions, as will be discussed below in greater detail. Memory 112 also stores a policy database 155, which contains data representing various policies related to communication device 104 and which is accessible to processor 108 during the execution of application 154.

Server 144 also includes one or more communications interfaces, such as a communications interface 156, for interconnecting with network 140 via a link 160. In the present embodiment, link 160 is a wired link, and communications interface 156 is a network interface controller (NIC) which enables communications based on the Ethernet standard. It is contemplated, however, that link 160 can be any suitable combination of wired and wireless links, and that the nature of communications interface 156 can be varied according to the nature of link 160.

Server 144 can be controlled by way of input and output devices (not shown) such as a keyboard, a mouse and a display. Such input and output devices can be co-located with server 144 (that is, can be local input and output devices) and connected with processor 148 via local connections (e.g. USB). In other embodiments, the input and output devices can be located at a terminal (not shown) remote from server 144 and connected to server 144 via network 140 and link 160. In some example embodiments, both local input devices and a remote terminal can be present, and server 144 can be controlled via either the local input devices or the remote terminal, as desired.

System 100 can also include additional computing devices, such as a second communication device 164. It is contemplated that such computing devices can include any number of mobile devices, servers and the like in addition to, or instead of, communication device 164. Communication device 164 is connected to network 140 via a link 168, which in the present example is a wired link, but can also be a wireless link or a combination of wireless and wired links. In the present example embodiment, communication device 164 is a hand-held wireless communication device, having a housing containing a processor interconnected with a processor and a communications interface, as well as input and output devices. The memory of communication device 164 can also contain a plurality of computer readable instructions executable by the processor of device 164, including a calendar application, a messaging application, a telephony application and the like.

In general, communication device 104 is adapted to send and receive communications, such as e-mail messages, Short Message Service (SMS) messages, calendar event invitations, telephone calls and the like. In response to receiving such communications, communication device 104 can generate various notification signals (e.g. speaker 124 can play a tone) according to configurable settings stored at device 104. For example, such settings can be stored in a profile database (not shown), from which an active one of a plurality of notification profiles can be selected and activated. Selection of a notification profile can be automatic; for example, processor 108 can be configured to store a profile identifier in connection with a calendar event in database 114, and to automatically enable the corresponding profile during the time period defined by that calendar event.

Further, processor 108 can be configured to enable and disable various functions of communication device 104 based on the contents of policy store 115. For example, policy store 115 may contain a policy specifying that a password required to "unlock" communication device 104 cannot be changed at device 104. A wide variety of policies are contemplated, examples of which will be discussed below in greater detail.

Server 144 can be associated with communication device 104, for example as an enterprise server serving communication device 104. To that end, server 144 can be configured to receive communications destined for communication device 104, to perform certain actions in response to receiving the communications, and to then forward the communications to communication device 104. Server 144 can also transmit policies from database 155 to communication device 104, for storage in policy store 115.

As will be discussed in greater detail below, system 100 can be configured to process calendar event invitation messages addressed to communication device 104 in order to disable various functions at communication device 104 based on the calendar event invitations.

Figure 2:
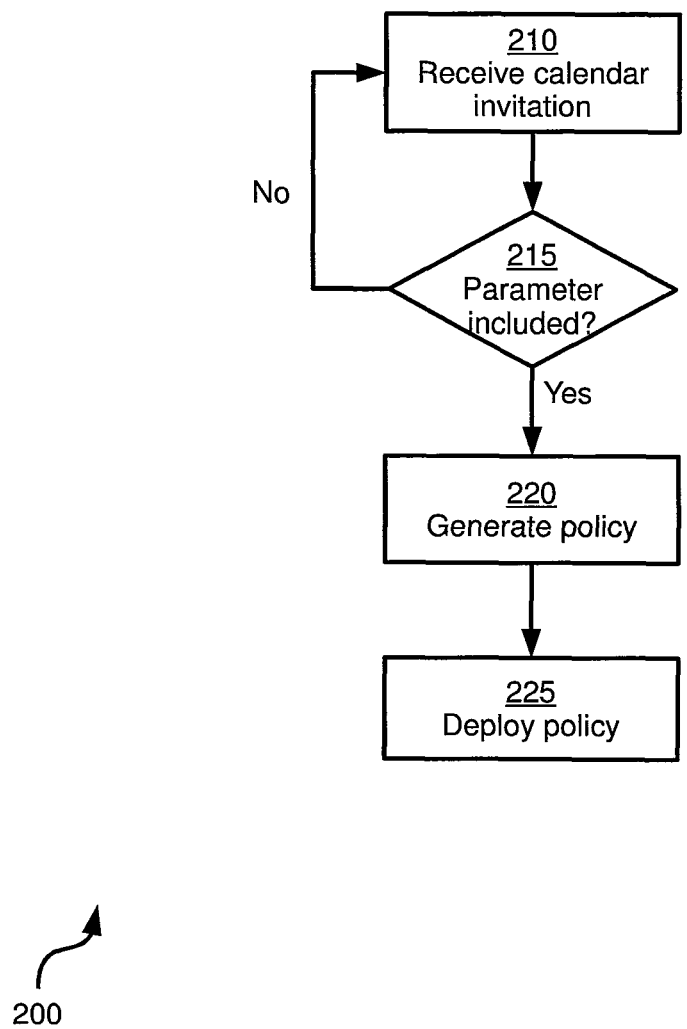
FIG. 2 depicts a method of processing calendar events, according to a non-limiting embodiment.

Turning now to FIG. 2, a method 200 of processing calendar invitations is depicted. At block 210, a calendar event invitation message addressed to at least one recipient device (communication device 104, in the present example) is received at one of communication device 104 and server 144 and stored in a memory. The calendar event invitation message includes data defining a calendar event, such as an identification of a time period and a description (also referred to as a subject) of the event. Although a calendar invitation message is discussed below, it is contemplated that in other embodiments, the data received at block 210 could also be a calendar event created and stored at communication device 104, and/or transmitted to server 144 for storage in a calendar database maintained in synchrony with communication device 104.

Following receipt of the calendar event invitation message at block 210, the receiver (either communication device 104 or server 144, as mentioned above) is configured to determine whether the message includes at least one parameter for disabling at least one recipient device function. When the determination is negative, the performance of method 200 can return to block 210, where communication device 104 and/or server 144 are configured to await the receipt of a further message.

When the determination at block 215 is affirmative, communication device 104 or server 144 can be configured to generate a recipient policy based on the at least one parameter. The recipient policy includes a recipient device function identifier identifying the function to be disabled, and a rule associated with the function identifier. For example, the function to be disabled can be the power supply for communication device 104. In other words, based on the at least one parameter, a policy can be generated at block 220 that causes communication device 104 to enter a low power "sleep" mode, or even a fully powered-off mode. The rule specifies, for example, the duration for which the identified function is to be disabled at communication device 104. The duration can be equal to the time period identified in the calendar event invitation message.

Following the generation of a policy at block 220, the performance of method 200 proceeds to block 225, at which the policy generated at block 220 is deployed for the recipient device, such that the identified function is disabled at the recipient device for at least the period of time identified by the rule. Deploying the policy can include transmitting the policy between server 144 and communication device 104.

Figure 3:
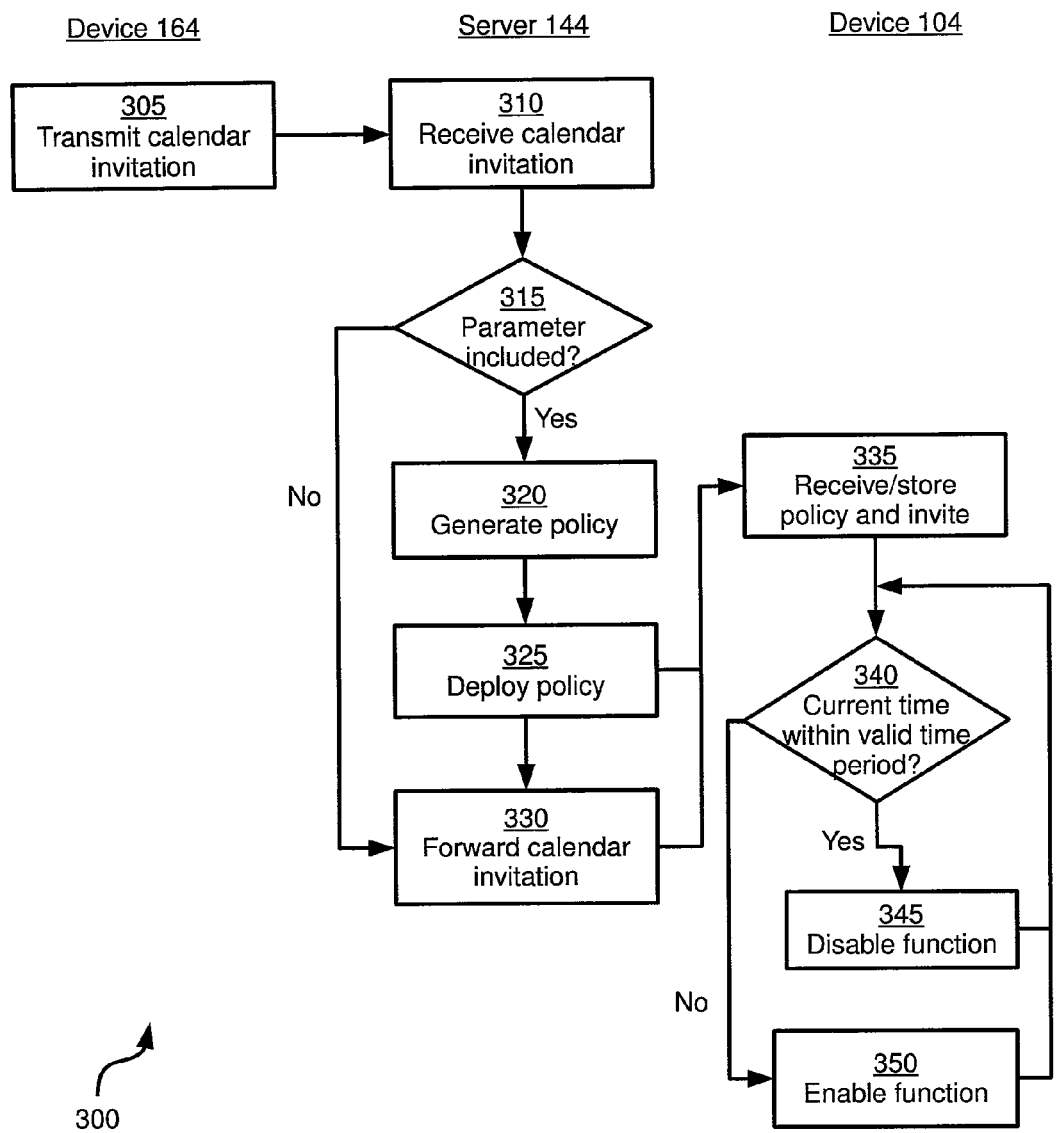
FIG. 3 depicts a method of processing calendar events, according to another non-limiting embodiment.

As noted above, the blocks of method 200 can be performed at different ones of server 144 and communication device 104. Turning now to FIG. 3, an example implementation of method 200 in system 100 will be discussed in more detail. The discussion below will also provide further understanding of the performance of method 200.

FIG. 3 depicts a method 300 of processing calendar invitations. Method 300 will be discussed in conjunction with an example of its performance on system 100, although it is contemplated that method 300 can be performed in any suitable system. Blocks of method 300 are illustrated as being performed at one of communication device 104, server 144, and communication device 164. The blocks of method 300 performed at communication device 104 are performed during the execution of at least application 113 by processor 108, making appropriate use of memory 112 and other components of communication device 104. Similarly, the blocks of method 300 performed at server 144 are performed during the execution of at least application 154 by processor 148. Thus, when processors 108 and 148 are said below to be configured to take various actions it is contemplated that processors 108 and 148 are so configured via execution of applications 113 and 154, respectively, in addition to other applications (including, for example, the respective operating systems of communication device 104 and server 144).

Beginning at block 305, communication device 164 is configured to transmit a calendar invitation message addressed to communication device 104. It is contemplated that the message can be addressed to an account (for example, identified by an email address) associated with communication device 104 rather than addressed explicitly to communication device 104. However, the message is referred to herein as being addressed to communication device 104 for simplicity.

Figure 4:
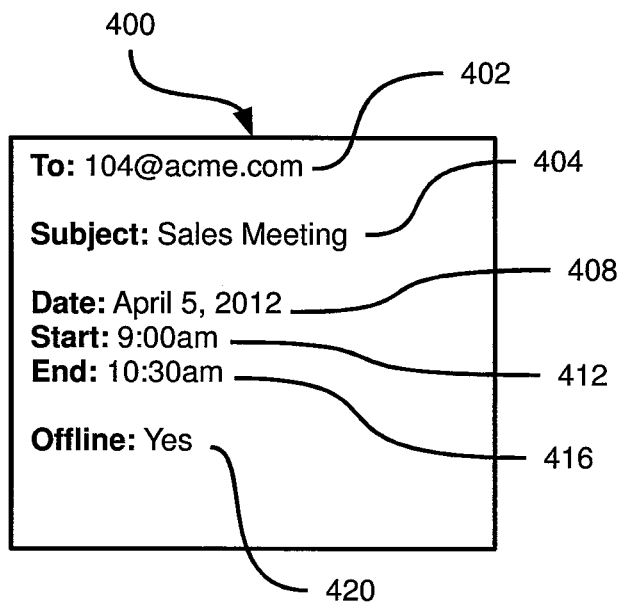
FIG. 4 depicts a calendar event invitation message, according to a non-limiting embodiment.

The calendar invitation message includes an identifier of communication device 104 (such as the above-mentioned email address), an identification of a time period (that is, identifications of a start date and time and duration, of a start date and time an end date and time, and the like), and can also include a description or "subject", as well as an identifier of a location. Turning to FIG. 4, an example invitation message 400 is shown. The format of message 400 shown in FIG. 4 is provided for illustrative purposes only, and it is contemplated that a wide variety of other formats can also be used. Invitation message 400 includes at least one recipient identifier 402 and a description, or subject, 404. Invitation message also includes a time period identification, comprising a date indicator 408 and start time and end time indicators 412 and 416. Invitation message 400 further includes at least one parameter 420 for disabling at least one recipient device function. Parameter 420 will be described in further detail below.

Returning to FIG. 3, the performance of method 300 continues at block 310, where processor 148 is configured to receive invitation message 400 via interface 156, and to store message 400 in memory 152. In response to the receipt and storage of message 400, processor 148 is configured to then perform block 315 of method 300. As mentioned earlier, the data received at block 310 can also be a new calendar event created at communication device 104 (via receipt of input data from keypad 116, for example), rather than an invitation message from device 164. Thus, block 310 can more generally include the receipt of data defining a calendar event, whether such data is a meeting invitation message addressed to communication device 104 or a message generated by communication device 104 defining a new calendar event (which need not have any invitees).

At block 315, processor 148 is configured to determine whether message 400 (that is, the message received at block 305) includes at least one parameter for disabling at least one recipient device function (in this case, for disabling at least one function at communication device 104). The determination at block 315 is performed by examining the contents of message 400. In the present example, parameter 420 is a field containing one of the values "yes" and "no", with a "yes" indicating that a recipient device function is to be disabled. Thus, processor 148 can be configured to determine whether message 400 includes a "yes" in the field named "Offline". A variety of other formats are possible for parameter 420. For example, parameter 420 can be either included or omitted entirely in message 400, with inclusion indicating that a recipient device function is to be disabled. In that case, processor 148 is configured to determine whether parameter 420 is present at block 315. In general, processor 148 is configured to search message 400 for at least one parameter according to a predefined convention shared between device 164 and server 144.

When the determination at block 315 is affirmative, the performance of method 300 proceeds to block 320. In the present example performance of method 300, the determination at block 315 is affirmative, as message 400 includes parameter 420 having the value "yes". Therefore, processor 148 is configured to perform block 320.

At block 320, processor 148 is configured to generate a recipient policy based on the at least one parameter contained in message 400. The policy generated at block 320 includes a recipient device function identifier, and a rule associated with the function identifier.

Figure 5:
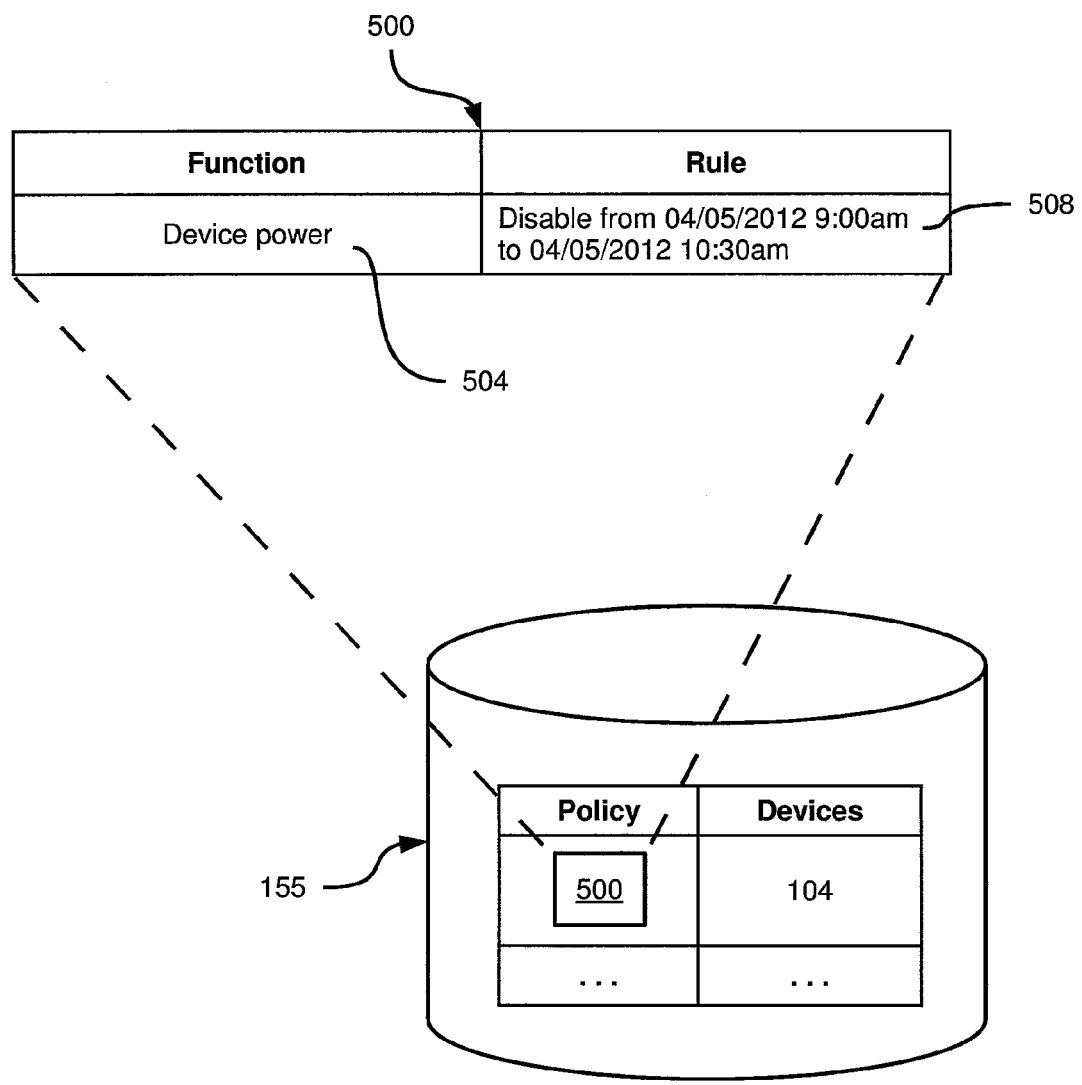
FIG. 5 depicts a policy for use in the methods of FIGS. 2 and 3, according to a non-limiting embodiment.

Referring now to FIG. 5, an example policy 500 is shown, resulting from the performance of block 320. Policy 500 includes at least one function identifier 504 and a rule 508 associated with function identifier 504. Processor 148 is configured to select function identifier 504 during the performance of block 320 based on parameter 420 of message 400. In the present example, parameter 420 indicates that the calendar event defined by message 400 is an "offline" meeting, meaning that any use of recipient devices (e.g. communication device 104) is prohibited during the time period identified by message 400. Processor 148 is therefore configured to identify device power (that is, the power supply to the various components of communication device 104) as the recipient device function to be disabled.

Various function identifiers can be selected at block 320, depending on the nature of parameter 420 in message 400. For example, referring to FIG. 6, a listing 600 is shown of parameters and corresponding recipient device functions. Processor 148 can be configured to store listing 600 in memory 154 and to select a recipient device function from listing 600 that matches the parameter (or parameters) in message 400. For example, as seen in listing 600, when message 400 includes the "offline" parameter (or the value "yes" in connection with an "offline" field, as seen above), processor 148 selects the device power function. When message 400 includes an "email only" parameter, processor 148 selects an instant messaging application and a telephony application as the recipient functions to disable. Additional non-email applications can also be selected. To that end, server 144 can maintain a list of applications installed at communication device 104. As a further example, when message 400 includes a "no email" parameter, processor 148 selects email forwarding as the recipient function to disable. As will be discussed below, this last example can be implemented at server 144.

Listing 600 can be configurable. Additional examples of parameter/function pairings will now occur to those skilled in the art. Recipient functions which can be disabled are not particularly limited. For example, specific applications stored in memory 112 can be disabled (that is, processor 108 can be prevented from executing those applications); power to one or more radios of network interface 132 can be disabled; power to one or both of speaker 124 and display 120 can be disabled; and so on. In other embodiments, message 400 can explicitly specify the function to be disabled at recipient devices such as communication device 104. In such examples, processor 148 need not refer to listing 600, but can instead be configured to select function identifiers directly from message 400.

Returning to FIG. 5, rule 508 includes an identification of a valid time period, during which policy 500 is active (that is, during which policy 500 will be implemented so as to disable the function identified by policy 500 at communication device 104). In the present example performance of method 300, processor 148 is configured to select the valid time period as being equivalent to the time period identified in calendar invitation message 400. Thus, rule 508 specifies that policy 500 is to be active (and therefore that the device power function is to be disabled) during the same time period as that defined by message 400. In other embodiments, processor 148 can be configured to set the valid time period for the rule by adding a predefined period of time (a "buffer" period) before, after, or both before and after, the time period identified in message 400.

Referring again to FIG. 3, the performance of method 300 continues at block 325, at which policy 500 is deployed. As part of the performance of block 325, processor 148 can be configured to store policy 500 in database 155 in association with an identifier of communication device 104, as seen in FIG. 5. It is contemplated that when message 400 is addressed to devices in addition to communication device 104, policy 500 can be associated with multiple recipient devices in database 155. In the present example, deployment also includes transmitting policy 500 to communication device 104 via network 140.

Proceeding to block 330, server 144 is configured to transmit message 400 to communication device via network 140. It is contemplated that the performance of block 330 can be substantially simultaneous with the transmission of policy 500 to communication device 104. In other embodiments, policy 500 can be transmitted separately from message 400, either before or after message 400 is transmitted.

At block 335, processor 108 of communication device 104 is configured to receive, via interface 132, policy 500 and message 400 (though not necessarily at the same time). Processor 108 can be configured to store message 400 in memory 112, specifically in database 114 as a calendar event. Processor 108 can also be configured to store policy 500 in memory 112, in policy store 115.

Having stored message 400 and policy 500, processor 108 is configured to perform block 340 of method 300. At block 340, processor 108 is configured to determine whether the current time is within the valid time period identified by rule 508. The determination at block 340 can be performed by comparing a current value from a clock maintained by processor 108 with the time period of rule 508. When the determination at block 340 is affirmative, performance of method 300 proceeds to block 345.

At block 345, processor 108 is configured to disable the function identified in policy 500. In the present example performance of method 300, processor 108 performs block 345 by enabling a low power "sleep" mode in which most components (except the afore-mentioned clock and certain portions of processor 108) of communication device, including all input and output devices and interface 132, are turned off. As mentioned above, a wide variety of functions can be disabled, and processor 108 can therefore be configured to take a variety of disabling actions at block 345, based on the function or functions identified in policy 500.

When the determination at block 340 is negative, processor 108 proceeds to block 350, at which the function identified by policy 500 is enabled. The performance of block 350 can include either re-enabling a previously disabled function, or leaving an already enabled function enabled. Following the performance of either blocks 345 or 350, processor 108 can return to block 340. It is contemplated, however, that processor 108 can also determine at block 340 whether the current time is after the valid time period of policy 500. In such cases, there is no need to repeat the performance of block 340 and the performance of method 300 can end.

Figure 6:
FIG. 6 depicts a function listing stored by the server of FIG. 1, according to a non-limiting embodiment.

Variations to the above are contemplated. In some embodiments, such as those in which the "no email" parameter shown in FIG. 6 is included in message 400, deploying policy 500 at block 325 need not include the transmission of policy 500 to communication device 104. Instead, processor 148 can be configured to store policy 500 and to perform blocks 340-350, as server 144 can be responsible for forwarding emails to communication device 104. In other embodiments, blocks 340-350 can be performed at both server 144 and communication device 104, when policy 500 includes some functions that can be disabled at server 144, and others that must be disabled at communication device 104.

Figure 7:
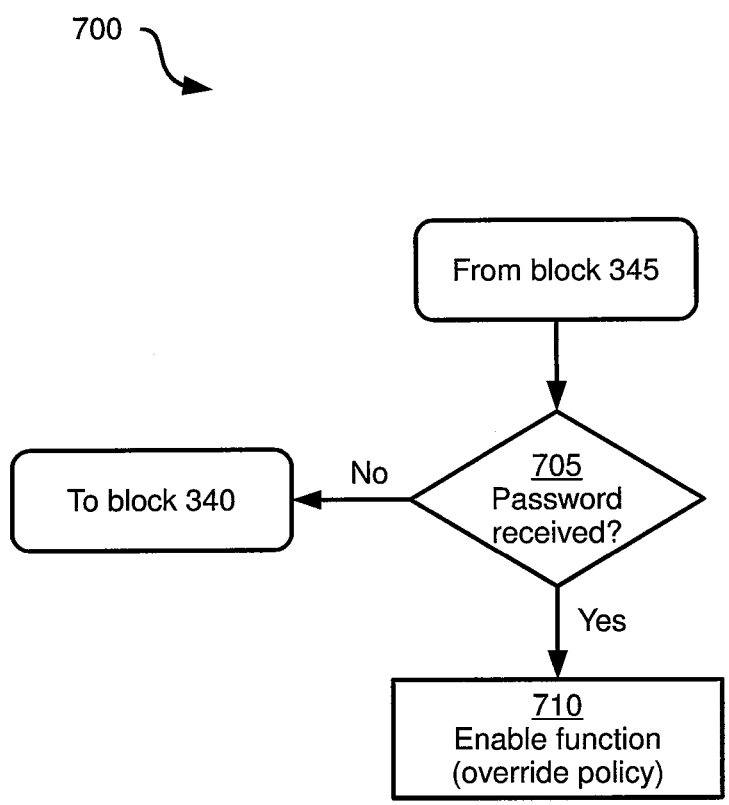
FIG. 7 depicts a method for overriding a policy, according to a non-limiting embodiment.

Another example variation is shown in FIG. 7, at which a method 700 of overriding policy 500 is shown. Following the performance of block 345 (by either server 144 or communication device 104), communication device 104 can determine at block 705 whether a password has been received via an input device (e.g. keypad 116). If the determination at block 705 is affirmative, processor 108 proceeds to re-enable the disabled function, regardless of the current time. If the determination is negative, processor 108 returns to block 340 (and the function remains disabled).

In other variations to the above, policy 500 can be generated at communication device 104 rather than server 144. Policy 500 can then be simply stored at communication device 104, or can also be transmitted to server 144. In other words, blocks 220 and 225 of method 200, and blocks 315-325 of method 300, can be performed at communication device 104 instead of being performed at server 144. It is contemplated that the generation of a policy need not be undertaken based on an invitation message received from a separate device, but can also be undertaken at communication device 104 in response to a calendar event being created at communication device 104 (for example, via input received from keypad 116).

It is also contemplated that processor 108, via execution of application 113, can be configured to generate calendar invitation messages such as message 400, including parameters for disabling recipient device functionality. Processor 108 can therefore be configured to provide an interface on display 120 for receiving input data representative of a time period, a description, and one or more parameters.

In an additional variation, it is contemplated that the calendar event invitation message or new calendar event need not include any parameters as discussed above. Instead, server 144 can, upon receiving an invitation message addressed to communication device 104, determine that all calendar events for communication device 104 are to be accompanied by an "offline" policy of the sort discussed above. For example, server 144 can store a list of communication devices associated with server 144 and identifiers of policies to be automatically generated and enforced on such devices. Server 144 can therefore automatically generate a policy as described above, regardless of the contents of the original invitation message or new calendar event. In this variation, the determination at blocks 215 and 315 is replaced by a determination as to whether to disable a function at a recipient device.

Those skilled in the art will appreciate that in some embodiments, the functionality of the applications stored in memories 112 and 152 can be implemented using pre-programmed hardware or firmware elements (e.g., application specific integrated circuits (ASICs), electrically erasable programmable read-only memories (EEPROMs), etc.), or other related components. In other embodiments, the computer readable instructions of the above applications can be stored on non-transitory computer readable media other than memories 112 and 152, such as a CD-ROM, a DVD, a USB drive and the like.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method in a server having a processor and a memory coupled to the processor, comprising:
   receiving, at the processor, a calendar event invitation message addressed to at least one recipient device connected to the server via a network;
   storing the calendar event invitation message in the memory;
   determining, at a processor, whether the calendar event invitation message contains an instruction to disable at least one recipient device function;
   when the determination is affirmative, generating a recipient policy at the processor, including a recipient device function identifier, and a rule defining a period of time associated with the function identifier; and
   transmitting the recipient policy and the calendar event invitation message from the server to the at least one recipient device such that the function is disabled at the at least one recipient device for the period of time.

2. The method of claim 1 wherein the instruction includes a field identifying the at least one device function, the field containing a parameter indicating whether the at least one device function is to be disabled.

3. The method of claim 1, comprising transmitting the recipient policy substantially simultaneously with the calendar event invitation message.

4. The method of claim 1, wherein the period of time defined by the rule is equal to a time period identified in the calendar invitation message.

5. The method of claim 1, wherein the at least one recipient device is configured to determine whether a current time falls within the period of time; and, when the determination is affirmative, to disable the at least one recipient device function.

6. A server, comprising:
   a memory;
   a communications interface; and
   a processor interconnected with the memory and the communications interface, the processor configured to receive a calendar event invitation message, via the communications interface, addressed to at least one recipient device and to store the calendar event invitation message in the memory;

the processor further configured to determine whether the calendar event invitation message contains an instruction to disable at least one recipient device function;

the processor further configured, when the determination is affirmative, to generate a recipient policy including a recipient device function identifier, and a rule defining a period of time associated with the function identifier; and the processor further configured to transmit the recipient policy and the calendar event invitation message from the server to the at least one recipient device such that the function is disabled at the at least one recipient device for the period of time.

7. The server of claim 6, wherein the instruction includes a field identifying the at least one device function, the field containing a parameter indicating whether the at least one device function is to be disabled.

8. The server of claim 6, the processor further configured to transmit the recipient policy to the at least one recipient device substantially simultaneously with the calendar event invitation message.

9. The server of claim 6 wherein the valid period of time defined by the rule is equal to a time period identified in the calendar invitation message.

10. A non-transitory computer readable medium storing a plurality of computer readable instructions executable by a processor of a server for implementing a method in the server, comprising:

receiving, at the processor, a calendar event invitation message addressed to at least one recipient device connected to the server via a network;

storing the calendar event invitation message in a memory coupled to the processor;

determining, at the processor, whether the calendar event invitation message contains an instruction to disable at least one recipient device function;

when the determination is affirmative, generating a recipient policy at the processor including a recipient device function identifier, and a rule defining a period of time associated with the function identifier; and transmitting the recipient policy and the calendar event invitation message from the server to the at least one recipient device such that the function is disabled at the recipient device for the period of time.

11. The non-transitory computer readable medium of claim 10 wherein the instruction includes a field identifying the at least one device function, the field containing a parameter indicating whether the at least one device function is to be disabled.

12. The non-transitory computer readable medium of claim 10, the method further comprising transmitting the recipient policy from the server to the at least one recipient device substantially simultaneously with the calendar event invitation message.

13. The non-transitory computer readable medium of claim 10, wherein the period of time defined by the rule is equal to a time period identified in the calendar invitation message.

14. The non-transitory computer readable medium of claim 10, wherein the at least one recipient device is configured to determine whether a current time falls within the period of time; and, when the determination is affirmative, to disable the at least one recipient device function.

* * * * *